United States Patent [19]

Nicholson

[11] Patent Number: 4,608,594
[45] Date of Patent: Aug. 26, 1986

[54] TELEVISION RECEIVER USING NON-INTERLACED SCANNING FORMAT WITH MOTION COMPENSATION

[75] Inventor: Warren H. Nicholson, Mercer County, N.J.

[73] Assignee: RCA Corporation, Princeton, N.J.

[21] Appl. No.: 614,310

[22] Filed: May 25, 1984

[51] Int. Cl.⁴ .................. H04N 9/78; H04N 11/00
[52] U.S. Cl. .................. 358/11; 358/31; 358/105
[58] Field of Search .................. 358/11, 12, 13, 31, 358/105

[56] References Cited

U.S. PATENT DOCUMENTS

| | | | |
|---|---|---|---|
| 4,400,719 | 8/1983 | Powers | 358/11 |
| 4,530,004 | 7/1985 | Achiha et al. | 358/11 |
| 4,558,347 | 12/1985 | Pritchard | 358/11 |

FOREIGN PATENT DOCUMENTS

| | | |
|---|---|---|
| 57151238 | 3/1984 | Japan . |
| 209050A | 12/1981 | United Kingdom . |
| 2111343A | 11/1982 | United Kingdom . |

OTHER PUBLICATIONS

A paper entitled "Signal Processing for Wide Screen Television: The Smart Receiver", by J. Nadan et al, Presented at the SMPTE Television Conference in Montreal, Canada, on Feb. 10–11, 1984.

Article by D. H. Pritchard entitled, "CCD Comb Filter for Color TV Receiver Picture Enhancement", published in RCA Review, vol. 41, Mar. 1980.

Primary Examiner—John W. Shepperd
Attorney, Agent, or Firm—P. J. Rasmussen; P. M. Emanuel; R. G. Coalter

[57] ABSTRACT

A television apparatus for displaying the picture information of an interlaced signal, such as a baseband NTSC signal, in a non-interlaced scanning format is described. When no picture change occurs, the picture information of the first and the second fields of the NTSC signal are displayed in alternate scan lines of the display of the apparatus, respectively, to form a picture frame during one vertical scanning interval. A signal, indicative that a picture change occurs in a section of the picture frame, is generated when a picture change occurs. The picture change indicative signal causes the displayed picture information in that section of the picture frame to be derived from one field of the NTSC signal.

11 Claims, 19 Drawing Figures

SEPERATOR BLOCK 135 OF UNIT 150 OF FIGURE 4

TELEVISION RECEIVER USING NON-INTERLACED SCANNING FORMAT WITH MOTION COMPENSATION

This invention relates to television systems and, more particularly, to television display apparatus, for displaying the picture information of a television signal that was produced by an interlace scanning process, hereinafter referred to as the interlaced signal, in a non-interlaced scanning format.

BACKGROUND OF THE INVENTION

Television signals based on present day standards create visible artifacts on conventional television receivers and monitors. In broadcast systems such as the 525 line-per-frame, 30 frame-per-second 525/30 NTSC system or the 625/25 PAL system, artifacts occur because of the interlaced scanning process. This process divides the 525-line picture or frame of the NTSC standard into two successive 262½-line fields. The 262½ lines of one field are scanned in 1/60th of a second followed by scanning of an additional 262½ lines of another field with lines of the second field occupying the spaces between the lines that of the first field. One subjective effect of this interlaced scan is to create in the presence of motion in the picture scene an apparent vertical drift of the lines of the raster known as "line crawl". The apparent drift is substantially more apparent when viewing a wide-screen display at close range. Another well-known objectionable visible effect is interline flicker on line-to-line transistion that occurs because of the interlaced scanning format.

Recent interest in the development of high definition television systems (HDTV) has been directed towards techniques that are intended to enhance the subjective performance of present systems within the contraints of existing standards. One approach, a technique referred to as progressive scan, or non-interlaced scan, has been described in patent materials and literature. For example, all the scan lines are scanned consecutively from the top of the display screen and downward to the bottom of the display screen during each vertical scanning interval. Progressive scan results in the reduction of interlaced scanning format related artifacts such as interline flicker and line crawl that exist in conventional two-to-one interlaced displays. The subjective effect is a more pleasing picture presentation to the viewer.

An aspect of the invention is using a field store and comb filters to generate from an incoming interlaced television signal two sets of interleaving display lines of a non-interlaced television display. In such an arrangement, in accordance with the invention, vertical detail is inserted in both sets of interleaving display lines.

Another aspect of the invention is that the picture details displayed in the non-interlaced format are made to substantially conform to the picture details contained in the interlaced signal, in the case where no motion in the picture scene is detected. Motion related aspects of the invention are described later on. Where no motion is detected, the picture information of one field of the interlaced NTSC signal is displayed in one set of the alternate scan lines, and that of the other field is displayed in a different set of scan lines that interleaves with the scan lines to form a picture frame. In the non-interlaced scanning format, each scan line of the one set is scanned immediately after the scanning of a scan line of the different set, for example, such that the picture progressively fill the screen of the display. All the scan lines of a picture frame are scanned consecutively during one vertical scanning interval.

Differences in scene content due to object movement or television camera panning that occur from one field time to the immediately following one are characterized as being visual motion of the scene content. If such motion is not taken into account in the course of displaying the picture contents of an interlaced signal in a non-interlaced scanning format, edges of moving objects may appear as having discontinuous transitions. This is so because the one set of displayed lines represents picture information that occurred one sixtieth of a second apart from picture information that is represented by the other set of displayed lines. The result is a jagged appearance for horizontal motion, and a smearing effect for vertical motion; such artifacts are objectionable.

Still another aspect of the invention is that when motion is detected in a section of the picture, then one field of the interlaced signal primarily is made to provide picture information for display in the scan lines of that section of the display where motion occurs. Thus, the picture information of moving edges of an object that is displayed in a non-interlaced format, is derived predominantly from one field of the interlaced signal. Therefore, the zigzag or jagged types of artifacts of moving objects that occur when a motion compensation scheme is not utilized, are reduced when the the picture information of moving objects is derived from one field of the interlaced signal.

Though some picture details are lost in such sections of the display screen when motion is detected, as a result of the motion compensation scheme of the invention, this loss in the presence of motion is not highly discernible. This is so because of the well-known fact that the ability of the human eye to discern fine picture details of moving objects is not as good as its ability to discern fine picture details of the same objects when they are stationary.

SUMMARY OF THE INVENTION

A television signal is applied to a first comb filter to produce a signal that contains a first component signal such as luminance. A delay element delays the television signal by substantially one field time. A second comb filter responsive to the field delayed televison signal produces a delayed video signal that contains the first component signal derived from the field delayed television signal. The signal that is produced by one of the first and second comb filters is used for developing a first video signal. The signals that are produced by the first and second comb filters are combined to form a second video signal. The video lines of the first and second video signals are capable of providing picture information for display in first and second pluralities of interleaving display lines, respectively, of a non-interlaced television display, to form a picture frame.

DETAILED DESCRIPTION OF THE INVENTION

Figure 1:
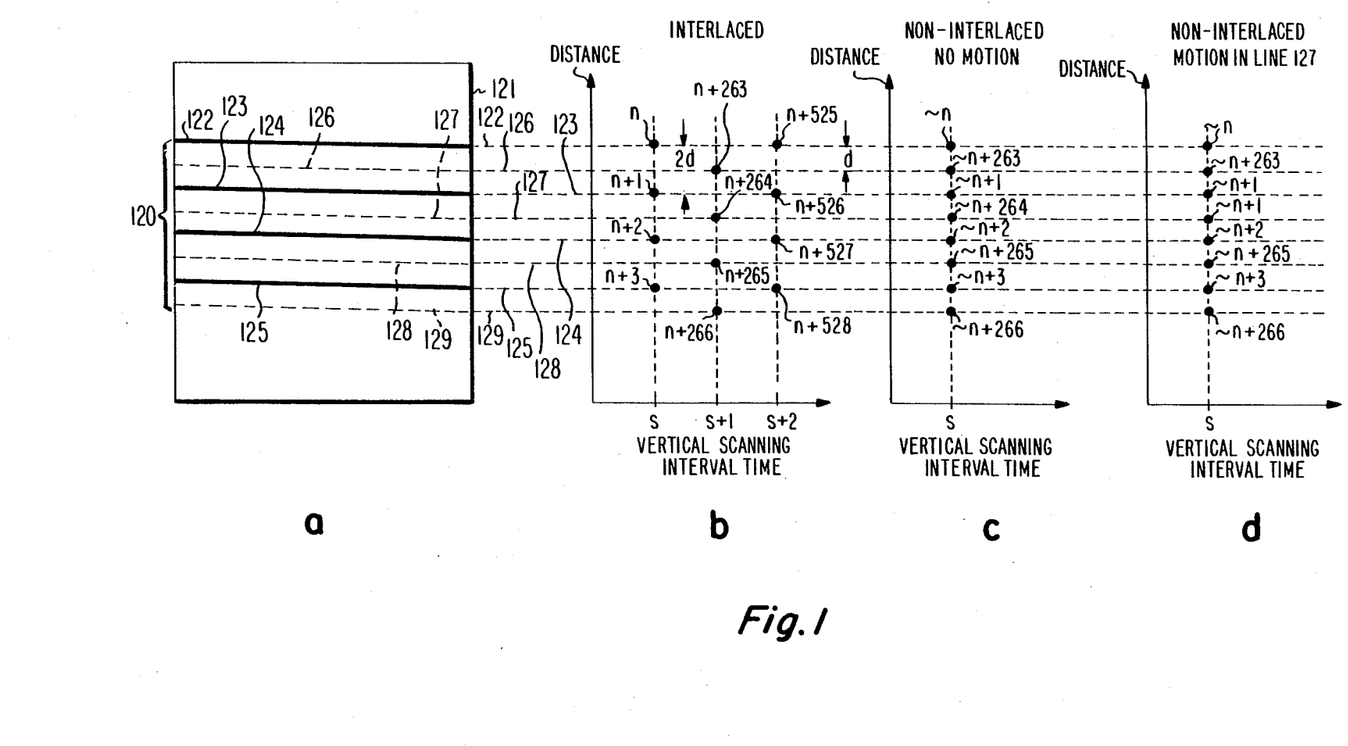
FIGS. 1a, 1b, 1c and 1d are useful in explaining the picture information from the television signal of FIG. 2 that is displayed in the corresponding scan lines of the cathode ray tube of FIG. 4.
Figure 4:
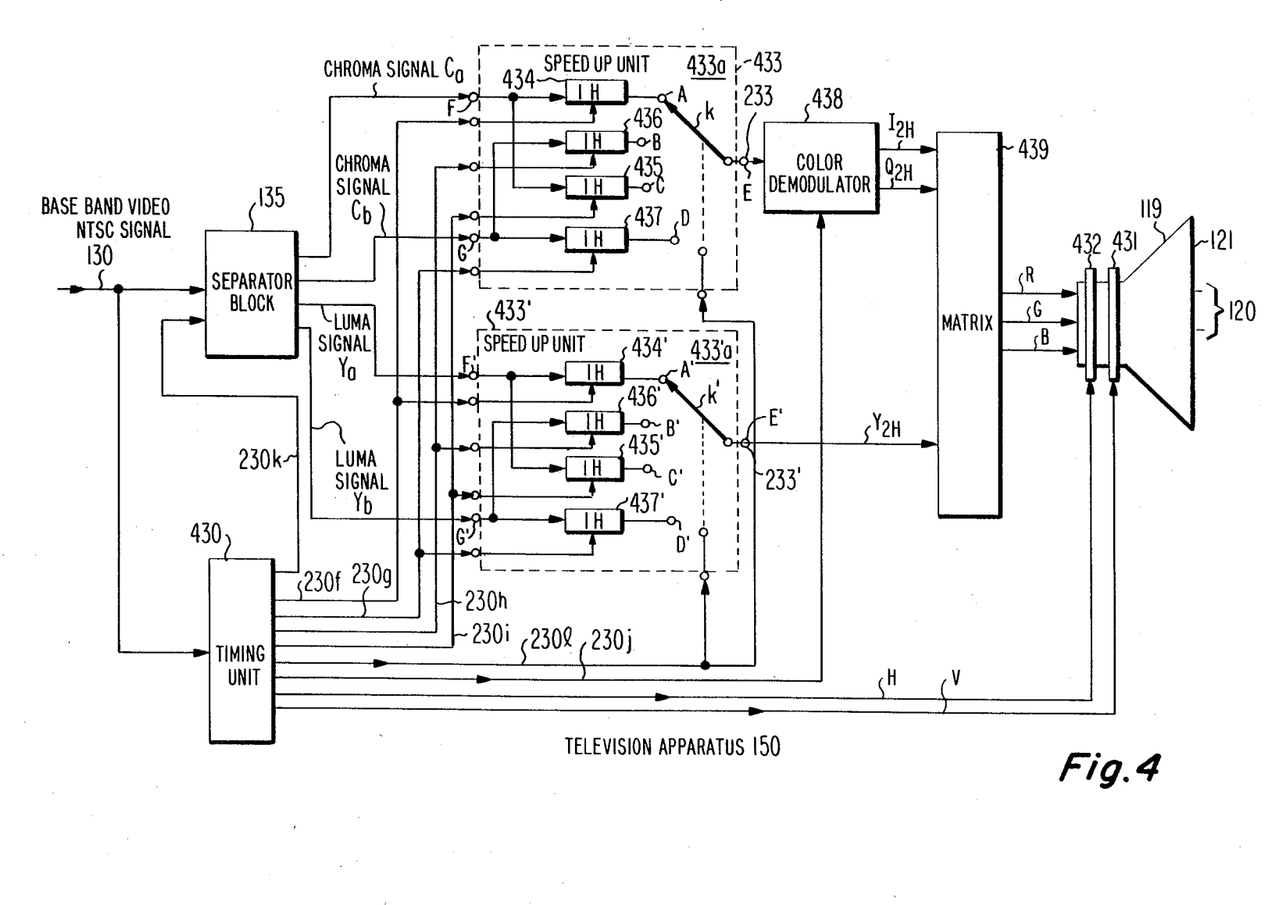
FIG. 4 illustrates the block diagram of a television apparatus of the invention that includes the separator block of FIG. 3 for displaying the picture information of the television signal of FIG. 2, in non-interlaced scanning format.

FIG. 1a illustrates a faceplate 121 of a cathode ray tube such as illustrated in FIG. 4, as described later on, that includes in a given portion 120 four horizontal display lines, 122–125, illustrated in solid lines, and four interleaving horizontal display lines, 126–129, illustrated in broken lines. FIG. 1a is used below in explaining the standard interlaced as well as the non-interlaced scanning format of the invention.

Figure 2:
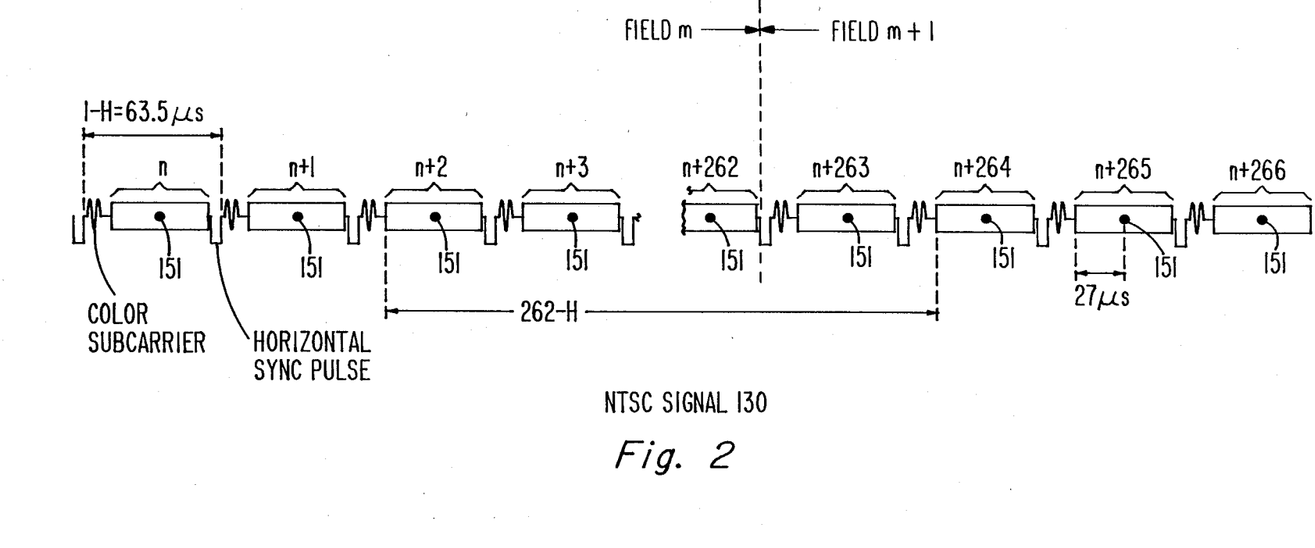
FIG. 2 illustrates schematically video lines in two consecutive fields of the television signal.

FIG. 2 illustrates schematically a composite interlaced color NTSC signal 130. In an interlaced scanning format, video lines n, n+1, n+2 and n+3 of a field m of signal 130 provide picture information for display in lines 122, 123, 124 and 125, respectively, of FIG. 1a. FIG. 1b illustrates schematically the vertical spacing between lines 122–125, respectively, and the associated video lines n through n+3 of field m of FIG. 2 having their picture information displayed in a vertical scanning interval s. Likewise, FIG. 2 illustrates schematically video lines n+263, n+264, n+265 and n+266, of the immediately following field, m+1, of signal 130 that provide picture information for display in lines 126, 127, 128 and 129, respectively, of FIG. 1a having their picture information displayed in a vertical scanning interval s+1. Similarly, FIG. 1b illustrates schematically the vertical spacing between lines 126–129, respectively and the four associated video lines n+263 through n+266 of field m+1 of FIG. 2 for the standard interlaced format. In the same manner, video lines n+525, n+526, n+527 and n+528 of a field m+2, not illustrated in FIG. 2, supply picture information for display in a vertical scanning interval s+2 in the interlaced scanning format in scan lines 122–125, as illustrated in FIG. 1b.

In 2:1 interlaced scanning format the picture information of only one field is displayed during one vertical scanning interval. Two adjacent display lines that display picture information from field m, such as display lines 122 and 123, are spaced vertically by a distance 2d, as illustrated in FIG. 1b. Whereas, adjacent display lines in which the picture information from fields m and m+1, respectively, is displayed, for example lines 122 and 126, are displaced vertically by a distance d which is ½ the length of distance 2d, as illustrated in FIG. 1b.

FIG. 4 illustrates a television apparatus 150, embodying aspects of the invention, that displays the picture information of an interlaced television signal in a non-interlaced format, as described later on. Apparatus 150 includes a cathode ray tube 119 having a faceplate 121 such as illustrated in FIG. 1a.

Figure 3:
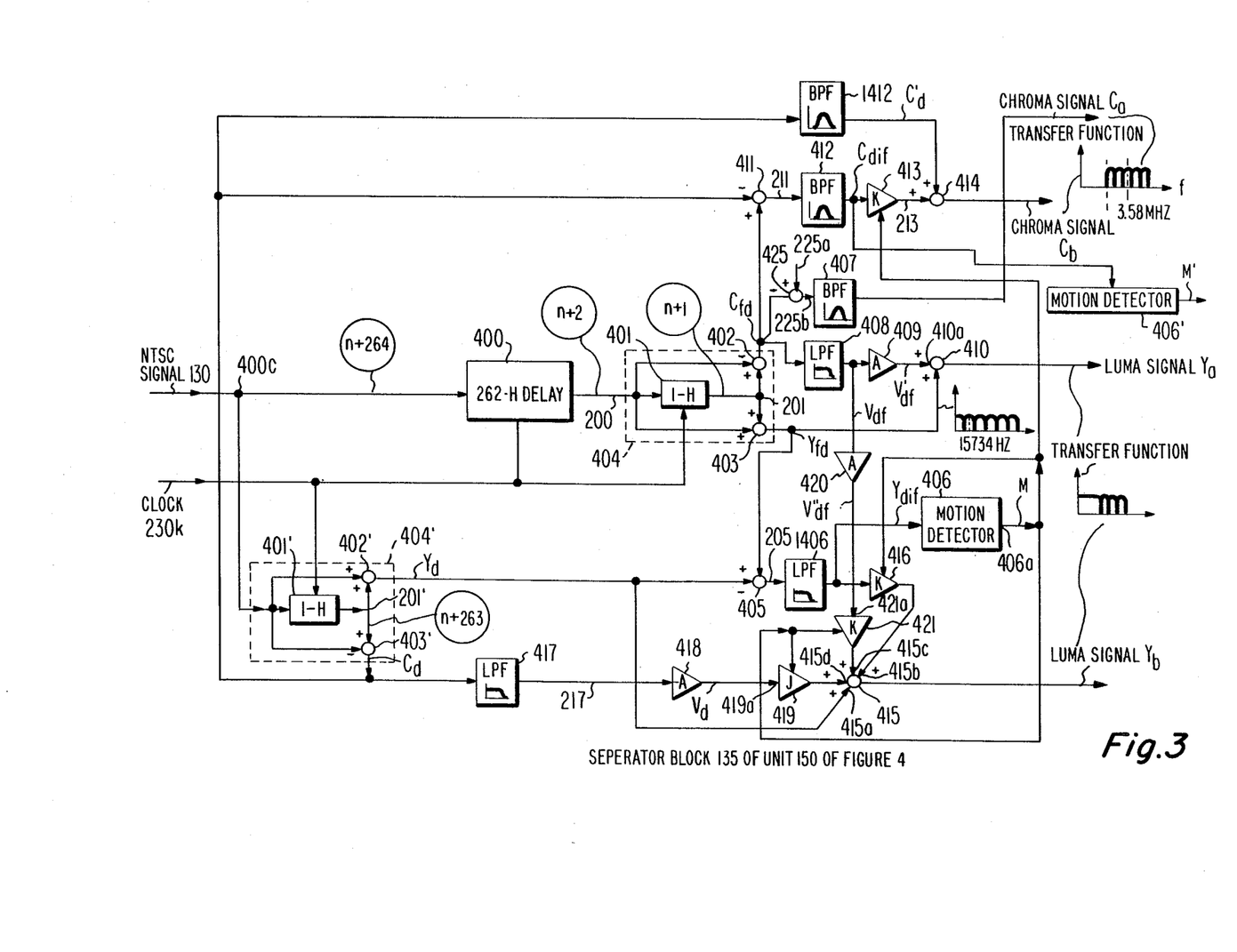
FIG. 3 illustrates the block diagram of the separator block of FIG. 4.

FIG. 3 illustrates a separator block 135 of apparatus 150 of FIG. 4 embodying aspects of the invention, for generating the signals that provide picture information for display in the display lines of faceplate 121 of FIG. 4 in a non-interlaced format. Identical numbers and symbols in FIGS. 1b, 2, 3, and 4 indicate similar items or functions. Referring to FIG. 3, an analog, composite NTSC signal 130 of FIG. 2 is applied to a terminal 400c of separator block 135 from a source which is not shown. The source of signal 130 may be the demodulated output of a conventional IF stage of a television receiver. It should be noted that the invention will be described with reference to NTSC composite signal but other interlaced signals are within the scope of the invention. The invention may be implemented using digital or analog techniques, or both.

NTSC signal 130 in FIG. 2 is applied to a separator 404' of FIG. 3 which is, illustratively, a two-terminal transversal filter having a 1-H delay unit 401', also known as a comb filter. The 1-H delay is equal to the scan line time of 63.5 microseconds, as illustrated in FIG. 2. 1-H delay unit 401' of FIG. 3 is a clocked first-in first-out (FIFO) buffer. A clock 230k supplies the clock signal to unit 401', as described later on. In separator 404' of FIG. 3, a 1-H delayed signal 201' and the non-delayed NTSC signal 130 are combined and the result multiplied by a scale factor of ½, in an adder/scaler 402', to form a luminance signal $Y_d$ which is combed. Luminance sign $Y_d$ includes the luminance-representative component of NTSC signal 130 of FIG. 2 having a frequency spectrum with signal energy in the vicinity of integer multiples of the 15,734 Hz line rate and nulls of signal energy in the vicinity of odd integer multiples of one half of the line rate. As a result of the combing process, the chrominance-representative component of NTSC signal 130 is substantially low in luminance signal $Y_d$ of FIG. 3.

Similarly, delayed and undelayed signals are applied to a subtractor/scaler 403' that subtracts the signals and multiplies the result by a scale factor of ½ to form a combed chrominance signal $C_d$. Signal $C_d$ represents a portion of the luminance information and the chrominance information having a frequency spectrum with signal energy concentrated in the vicinity of odd integer multiples of one half the line rate and nulls of signal energy in the vicinity of integer multiples of the line rate. As a result of the combing process, the luminance-representative component of NTSC signal 130 of FIG. 2 is substantially reduced in signals $C_d$ of FIG. 3.

NTSC signal 130 is delayed by a 262-H delay unit 400, where 262-H delay is equal to 262 times the video line time of 63.5 microseconds, which is substantially a field time of NTSC signal 130, as illustrated in FIG. 2, to form a signal 200. Unit 400 is a clocked first-in first-out buffer. Clock 230k supplies the clock signal to unit 400, as described later on. Signal 200 is applied to a separator 404 which is, illustratively, similar to separator 404'. Separator 404 generates signals $Y_{fd}$, $C_{fd}$ and 201 that correspond to signals $Y_d$, $C_d$ and 201' of separator 404', respectively and have a similar frequency spectrum contents. Luminance signal $Y_d$ is subtracted from signal $Y_{fd}$ in a subtractor 405 and a resulting signal 205 is applied through a low pass filter 1406 to form a luminance motion signal $Y_{dif}$, as described later on.

Figure 5:
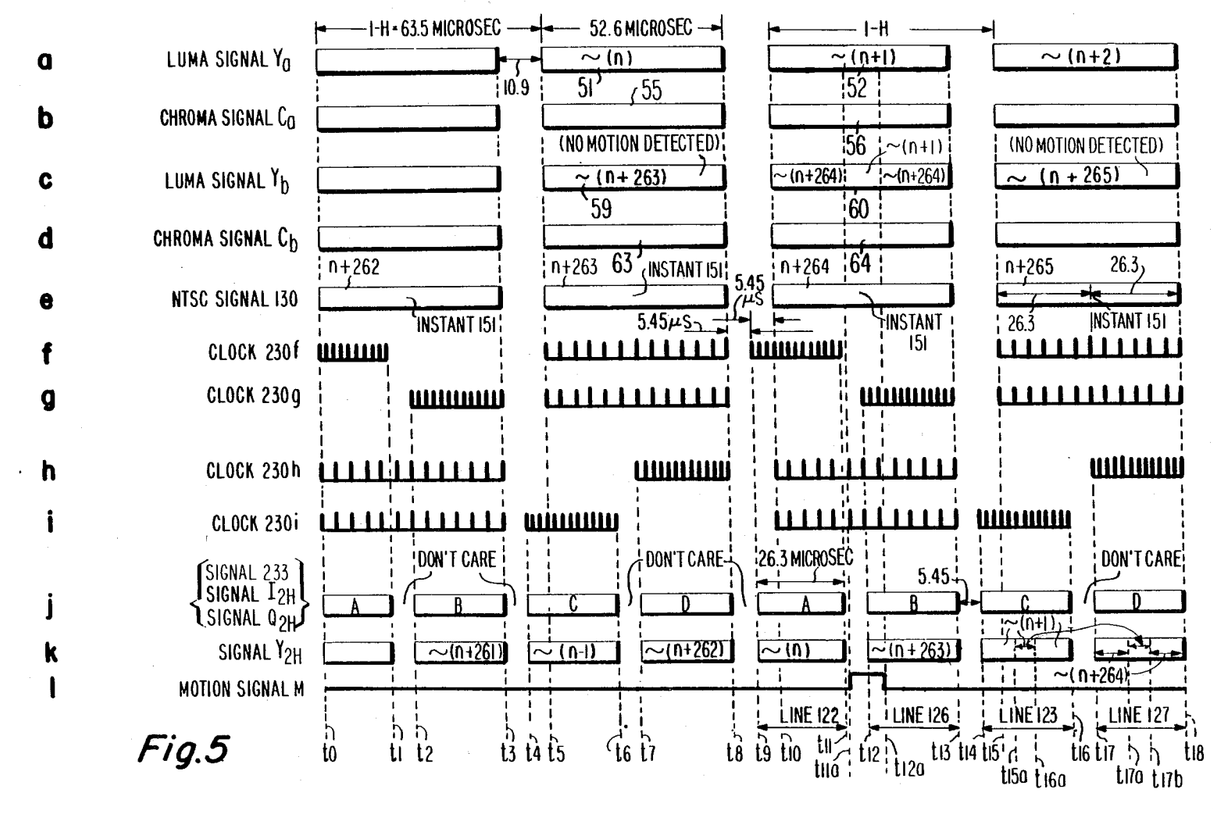
FIGS. 5a–5l illustrate schematically timing diagrams useful in explaining the operation of the television apparatus of FIG. 4.

Referring to FIG. 2, instants 151, indicate the midpoints in time of each of video lines n through n+3 and n+262 through n+265, respectively. Assume that video line n+264 at its instant 151 is present at terminal 400c of block 135 of FIG. 3 as illustrated symbolically in the respective circle in FIG. 3 that contains the symbol n+264. FIG. 5e illustrates schematically video lines of NTSC signal 130 of FIG. 2. In FIG. 5e, video line n+264 is illustrated between time t10 and time t13. Identical numbers in FIGS. 5e and 2 indicate identical items or functions. It follows that video signals 200, 201 and 201' of FIG. 3 are equal to video lines n+2, n+1 and n+263 of FIG. 2, respectively, at their respective instants 151, as illustrated symbolically inside the respective circles in FIG. 3.

Luminance signal $Y_{fd}$, at instant 151, is equal to one-half the term that is obtained by adding the instantaneous level of video line n+2 to that of video line n+1 at their respective instants 151. Thus, luminance signal $Y_{fd}$ at instant 151 represents the averaged or estimated luminance of consecutive video lines in field m of NTSC signal 130 of FIG. 2. Simultaneously, luminance signal $Y_d$ is equal to one-half the term that is obtained by adding video line n+263 to video line n+264 at their respective instants 151. Thus, luminance signal $Y_d$ at instant 151 represents the averaged or estimated luminance of consecutive video lines from field m+1 of NTSC signal 130 of FIG. 2.

Also assume that in the absence of motion, signals $Y_{fd}$ and $Y_d$ of FIG. 3 are of close values because of the high correlation between the picture information that characterizes adjacent locations on the faceplate 121 of FIG. 1a. Thus, in the absence of motion, signal $Y_{dif}$ that is obtained by subtracting luminance signal $Y_d$ from luminance signal $Y_{fd}$, is small. Motion causes the amplitude of motion signal $Y_{dif}$ to be higher than in the case of no motion. This is so because from the time field m of NTSC signal 130 of FIG. 2 is generated, in a television camera, to the time field m+1 is generated, the object moves causing the picture to change; therefore, the signal $Y_{dif}$ increases. Low pass filter 1406 removes high frequencies, illustratively over 1 MHz, in order to eliminate the residual chrominance signal in signal $Y_{dif}$ that may remain in signal 205.

The following equation summarizes the process of generating motion signal $Y_{dif}$ in the frequency range up to the cutoff frequency of low pass filter 1406, between times t10 and t13 of FIG. 5e:

Motion signal $Y_{dif}$ =

$$\frac{\text{Video line } n + 1 \text{ plus video line } n + 2}{2} -$$

$$\frac{\text{Video line } n + 263 \text{ plus video line } n + 264}{2}$$

In one embodiment, motion detector 406 may include a peak detector that receives motion signal $Y_{dif}$ and generates a detected luminance motion signal M at a terminal 406a that is indicative of the absolute value of the peak voltage of motion signal $Y_{dif}$. Also, detector 406 may include an integration circuit for integrating the output signal of the peak detector. In addition, motion signal M may be generated to occur during only an entire scan line time or only an entire frame time. The operations accomplished by motion signal $Y_{dif}$ and motion signal M are described later on.

Combed chrominance signal $C_{fd}$ of separator 404 of FIG. 3 is coupled to a subtractor 425 that inverts the polarity of signal $C_{fd}$. In subtractor 425, signal $C_{fd}$ is subtracted from a signal 225a having the value 0 for generating a signal 225b in which the phase of the color subcarrier is inverted relative to that in signal $C_{fd}$. Signal 220b is band pass filtered in a band pass filter 407 to provide a chroma signal $C_a$. The luminance information remaining in chrominance signal $C_{fd}$ after the line combing process, is substantially reduced in chroma signal $C_a$. When video line n+264 of FIG. 2 is coupled to terminal 400c of FIG. 3, chrominance signal $C_{fd}$ is equal to one half the term that is obtained by subtracting video line n+1 from video line n+2. The respective phase of the color subcarrier in video lines n+2 and n+1 are 180° apart. Therefore, chrominance signal $C_{fd}$ as well as chroma signal $C_a$ contains the "averaged" chrominance information of video lines n+2 and n+1 of field m of FIG. 2. Some reduction in chrominance picture resolution occurs as a result of the averaging process. The effect of such reduced resolution in the chrominance contents of the picture is not significant because of the well known fact that the human eye's sensitivity to fine chrominance details is low. FIG. 5b illustrates schematically chroma signal $C_a$ that includes a chroma line 56 from time t10 to time t13.

The following equation summarizes the process for generating chroma line 56 of chroma signal $C_a$ of FIG. 5b in the range of frequencies of the respective band pass filter:

$$\text{chroma line } 56 = \frac{\text{video line } n + 2 \text{ minus video line } n + 1}{2}$$

It can be deduced from the equation of chroma line 56 that chroma signal $C_a$ of FIG. 3 contains the averaged chrominance component of the respective video lines of NTSC signal 130.

Chrominance signal $C_{fd}$ of separator 404 is low pass filtered in low pass filter 408, having illustratively 1 MHz cut-off frequency, to form a vertical detail signal $V_{df}$. Signal $V_{df}$ is applied via a gain device 409 to form a vertical detail signal $V'_{df}$. Signal $V'_{df}$ is coupled to an input terminal 410a of an adder 410. Combed luminance signal $Y_{df}$ is coupled to the other input terminal of adder 410 that adds the signals at its respective terminals to form a luma signal $Y_a$. Signal $V'_{df}$ of FIG. 3 restores low frequency vertical details of luminance signal $Y_{fd}$ that are missing as a result of the combing process in separator 404, as explained in detail below. The gain factor A of gain device 409 may be a constant or may vary with the level of vertical detail signal $V_{df}$ of low pass filter 408 to provide a subjectively pleasing picture. FIG. 5a illustrates schematically luma signal $Y_a$ that includes a signal part 52 from time t10 to time t13.

The following equation summarizes the process of generating luma line 52 of luma signal $Y_a$ of FIG. 5a in the range of frequencies below the cutoff frequency of the corresponding low pass filter:

$$\text{luma line } 52 = \frac{\text{video line } n + 2 \text{ plus video line } n + 1}{2} +$$

$$A \times \frac{\text{video line } n + 1 \text{ minus video line } n + 2}{2}$$

Assume that gain device 409 has a unity gain. Therefore, in the first 1 MHz of the spectrum of signal 130 of FIG. 2, the above equation becomes reduced to: luma line 52=n+1. Thus, luma line 52 is equal to the luminance component of video line n+1, as indicated by the symbol ~(n+1) in FIG. 5a. Thus, luminance signal $Y_a$ of FIG. 5a contains all luminance information in the first 1 MHz of NTSC signal 130 of FIG. 2.

Combed chrominance signal $C_d$ of separator 404' is subtracted from combed chrominance signal $C_{fd}$ of separator 404 in a subtractor 411 to form a signal 211. Signal 211 is bandpass filtered in a band pass filter 412 to form a difference signal $C_{dif}$. Band pass filter 412 passes, illustratively, the frequency spectrum range from 2.5 to 4.5 MHz, and attenuates substantially signal 211 outside this range. Sign $C_{dif}$ may supply a chrominance motion estimate and is analogous to luminance motion signal $Y_{dif}$. Signal $C_{dif}$ is coupled through a gain controlled device 413 to form a signal 213. Illustratively, the gain factor K of device 413 increases as the absolute value of motion signal $Y_{dif}$ increases, and vice versa.

Assume, in a first hypothetical example, that the gain factor K is equal to 1, corresponding to a unity gain, when the absolute value of motion signal $Y_{dif}$ exceeds a first level. K=1 is indicative that motion is detected. Conversely, K is equal to 0, corresponding to zero gain, when the absolute value of motion signal $Y_{dif}$ does not exceed the first level. K=0 is indicative that motion is not detected. It should be understood that other motion indicative signals may be used, instead, for controlling gain controlled device 413. One such example is a signal that is derived from signal $C_{dif}$.

Combed chrominance signal $C_d$ of separator 404' is coupled through a band pass filter 1412, that is illustratively similar to band pass filter 412 or 407, to form a chrominance signal $C'_d$. Chrominance signal $C'_d$ is added to signal 213 in an adder 414 to form a chroma signal $C_b$. FIG. 5d illustrates schematically chroma signal $C_b$ that includes a chroma line 64 from time t10 to time t13. The following equation summarizes the process of generating chroma line 64 of FIG. 5d within the range of frequencies that are passed in the corresponding band pass filters:

chroma line 64 =

$$\frac{\text{video line } n + 263 \text{ minus video line } n + 264}{2} +$$

$$K \times \frac{\text{video line } n + 1 \text{ minus video line } n + 2}{2} -$$

$$K \times \frac{\text{video line } n + 263 \text{ minus video line } n + 264}{2}$$

Assuming the facts of the first hypothetical example, K=0 when motion is not detected. Therefore, the above equation becomes reduced to:

$$\text{chroma line 64} = \frac{\text{video line } n + 263 \text{ minus video line } n + 264}{2}$$

Similarly to chroma signal $C_a$, that was discussed above, chroma signal $C_b$ contains averaged chrominance information of NTSC signal 130. On the other hand, when motion is detected, then in the frequency spectrum that is passed by band pass filter 412, the above equation that summarizes the process becomes reduced to:

$$\text{chroma line 64} = \frac{\text{video line } n + 1 \text{ minus video line } n + 2}{2}$$

Thus, in the first example in which k=1 when motion is detected, chroma line 64 of chroma signal $C_b$ contains the averaged chrominance picture information of video lines n+1 and n+2 of field m of NTSC signal 130; whereas, when motion is not detected it contains the averaged chrominance picture information of video lines 264 and 263 of field m+1 of NTSC signal 130. Note that when motion is detected, chroma signals $C_a$ and $C_b$ contain substantially the same chrominance information that is derived from the same field of NTSC signal 130.

Luminance signal $Y_d$ of separator 404' of FIG. 3 is coupled to an input terminal 415a of an adder 415. Signal $Y_{dif}$ is coupled through a gain controlled device 416 to an input terminal 415b of adder 415. Device 416 is controlled by motion signal M, illustratively, in a similar manner as gain controlled device 413. In the first hypothetical example, assume that the gain factor K is equal to 1, when the value of motion signal $Y_{dif}$ exceeds the first level. K=1 indicates that motion is detected, as in device 413. Conversely, K is equal to 0 when motion is not detected as in device 413.

Combed signal $C_d$ of separator 404' is coupled through a low pass filter 417, having illustratively 1 MHz cutoff frequency, to form a signal 217. Signal 217 is coupled through a gain device 418 to an input terminal 419a of a gain controlled device 419 to form a vertical detail signal $V_d$. Gain device 418, illustratively, has the same characteristics as gain device 409 and functions similarly except that the gain factor $-A$ is negative for the purpose of inverting the polarity of signal 217. Vertical detail signal $V_d$ is coupled through gain controlled device 419 to an input terminal 415d of adder 415. Gain controlled device 419 operates in an opposite manner from any of gain controlled devices 413 and 416. In device 419, the gain factor J increases when the value of motion signal M decreases, and vice versa. Assume in the first hypothetical example that gain device 418 has a unity gain and that the gain factor J is equal 0 when the value of motion signal $Y_{dif}$ exceeds the first level. J=0 indicates that motion is detected. Conversely, J equals 1 when the absolute value of motion signal $Y_{dif}$ does not exceed the first level. J=1 indicates that no motion is detected. Vertical detail $V_{df}$, that is the low pass filtered signal $C_{fd}$, is coupled through a gain device 420 to form a vertical detail signal $V''_{df}$ at an input terminal 421a of a gain controlled device 421. Gain device 420, illustratively, has the same characteristics as gain device 409 and functions similarly. Assume for the first hypothetical example that gain device 420 has a unity gain. Gain controlled device 421 is controlled by motion signal M, illustratively, in a similar manner as gain controlled device 413 or 416. Thus the gain factor K of gain controlled device 419 equals 1 when motion is detected and equals 0 when motion is not detected. Signal $V''_{df}$ is coupled through gain controlled device 421 to an input terminal 415c of adder 415. Adder 415 combines the signals at terminals 415a–d to form a luma signal $Y_b$. FIG. 5c illustrates schematically luma signal $Y_b$ that includes a luma line 60 from time t10 to time t13.

The following equation summarizes the process of generating luma line 60 of FIG. 5c in the frequency range up to the cutoff frequency of the respective low pass filter:

luma line 60 =

$$\frac{\text{video line } n + 263 \text{ plus video line } n + 264}{2} +$$

$$K \times \frac{\text{video line } n + 2 \text{ plus video line } n + 1}{2} -$$

$$K \times \frac{\text{video line } n + 263 \text{ plus video line } n + 264}{2} +$$

$$A \times K \times \frac{\text{video line } n + 1 \text{ minus video line } n + 2}{2} -$$

$$A \times J \times \frac{\text{video line } n + 263 \text{ minus video line } n + 264}{2}$$

Assume the facts of the first hypothetical example that when motion is not detected, k=0 and J=1. Thus, for frequencies up to the cut-off frequencies of the low pass filters, the above equation becomes reduced to:

luma line 60 = video line n+264.

Thus, when motion is not detected, luma signal $Y_b$ contains the luminance information of the respective video line of NTSC signal 130 that occurs simultaneously in terminal 400c. It should be understood that in this case, luma signal $Y_b$ is formed by signal $Y_d$ that is coupled to terminal 415a of adder 415 and by vertical detail signal $V_d$ which reinserts vertical detail through terminal 415d of adder 415.

Similarly, when motion is detected k=1 and J=0. Thus, for frequencies up to the cut off frequencies of the low pass filters, the above equation becomes reduced to:

luma line 60 = video line n+1.

Thus, when motion is detected, luma signa $Y_b$ substantially contains the same luminance information that is provided by luma signal $Y_a$. This luminance information was supplied by video line n+1 in the prior field time of NTSC signal 130. It should be understood that in this case, luma signal $Y_b$ is formed by signal $Y_{dif}$ that is coupled to terminal 415b of adder 415 and by vertical detail signal $V_{df}$ which reinserts vertical detail through terminal 415c of adder 415.

Each of luma lines 52 and 60 and chroma lines 56 and 64, for example, of FIGS. 5a, 5c, 5b and 5d, respectively, is developed at the same time that video line n+264 of FIG. 5e is being developed. Luma line 52 and chroma line 56 of luma signal $Y_a$ and chroma signal $C_a$, respectively, of FIGS. 5a and 5b, respectively, provide luma and chroma information, respectively, for display in line 123 of FIG. 1a as described later on. Similarly, luma line 60 and chroma line 64 of luma signal $Y_b$ and chroma signal $C_b$, respectively, of FIGS. 5c and 5d, respectively, provide luma and chroma information, respectively, for display in line 127 of FIG. 1a. Line 127 is immediately adjacent to line 123.

FIG. 5l illustrates an example of motion signal M of FIG. 3. There, motion is detected between time t11a and t12a. FIG. 5c illustrates the effect of motion signal M on the contents of luma line 60.

As explained before, irrespective of motion signal M, luma line 52 and chroma line 56 of FIGS. 5a and 5b, respectively, contain the approximated luminance and chrominance picture information, respectively, of video line n+1 of field m of NTSC signal 130 of FIG. 2.

When no motion is detected, luma line 60 chroma line and 64 of FIGS. 5c and 5d, respectively, contain the approximated luminance and chrominance picture information, respectively, of video line n+264 of field m+1 of NTSC signal 130 of FIGS. 2 and 5e.

On the other hand, when motion is detected, luma line 60 and chroma line 64 of luma signal $Y_b$ and chroma signal $C_b$ of FIGS. 5c and 5d, respectively, contain substantially the same approximated picture information as in luma line 52 and chroma line 56, respectively, of FIGS. 5a and 5b, respectively. Thus, so long as motion signal M of FIG. 3 indicates that motion is detected, the picture information that is displayed in adjacent display lines is the same except for very fine picture details, assuming the facts of the first hypothetical example. Therefore, the artifacts that would have caused discontinuities in the edges of moving objects, as explained before, are eliminated.

The motion compensation scheme may be activated by motion detector 406 of FIG. 3 on a pixel basis as illustrated in FIGS. 5c and 5l, thus compensating for motion in a given section of a display line. Alternatively, once activated, the motion compensation scheme may remain operative over an entire line or frame period.

In the first hypothetical example the gain factor K of devices 413, 416 and 421 is equal to 1 and the gain factor J of device 419 is equal to 0 when motion is detected; conversely, when no motion is detected the gain factor K of devices 413, 416 and 421 is equal to 0 and the gain factor J of device 419 is equal to 1. As a trade off between motion compensation and vertical picture resolution, the respective gain factor may exhibit a more smooth or soft characteristic as a function of the absolute value of motion signal $Y_{dif}$ of FIG. 3. Thus, motion signal M may cause devices 413, 416, 419 and 421 to proportionate the respective signal parts of NTSC signal 130 of FIG. 2 that are included in luma signal $Y_b$ and chroma signal $C_b$ of FIGS. 5c and 5d, respectively. Alternatively, some or all of the gain factors K and J of devices 413, 416, 419 and 421 of FIG. 3 may be set to a certain value independently of motion signal M.

Television apparatus 150 of FIG. 4 includes separator block 135 of FIG. 3. NTSC signal 130 of FIG. 2 is also coupled in apparatus 150 to a timing unit 430. Timing unit 430 utilizes horizontal and vertical sync pulses of NTSC signal 130 for generating a synchronized horizontal scanning current H and a synchronized vertical scanning current V for driving a horizontal deflection winding 432 and a vertical deflection winding 431, respectively. The scanning frequency of horizontal scanning current H is twice that of a standard television receiver using the interlaced scanning format; whereas, the frequency of vertical scanning current V is of the same. Timing unit 430 may include a phase-locked-loop circuit, not shown, that generates clock signals that are phase locked to the color burst signal of NTSC signal 130 of FIG. 2 for generating clock signals $230j-k$ and for generating a timing signal $230l$, all of FIG. 4. Clock signal $230k$ of illustratively $4 \times Sc$, where Sc is the 3.58 MHz frequency of the color subcarrier of NTSC signal 130 of FIG. 2 is coupled to separator block 135 for clocking the clocked delay lines, as explained before.

Referring to FIG. 4, chroma signal $C_a$ of block 135 of FIGS. 3 is applied through a terminal F to 1H delays 434 and 435, respectively. Chroma signal $C_b$ of block 135 of FIG. 3 is applied through a terminal G to 1H delay units 436 and 437 of FIG. 4, respectively. The 1H delay units 434–437 may comprise first-in first-out (FIFO) buffers.

FIGS. 5f–5i illustrate schematically clocks $230f$, $230g$, $230h$ and $230i$ of FIG. 4 respectively, that are coupled to 1H delay units 434, 436, 435 and 437, respectively. Clock $230f$ of FIG. 5f clocks samples of a chroma line 55 of chroma signal Ca of FIG. 5b between time t5 and time t8, for example, into 1H delay unit 434 of FIG. 4 at a first clock rate as illustrated by the short vertical lines in FIG. 5f. Simultaneously, clock $230g$ of FIG. 5g clocks samples of a chroma line 63 of chroma signal Cb of FIG. 5d into 1-H delay unit 436 of FIG. 4 at the same first clock rate. The samples in unit 434 of FIG. 4 are clocked out at a second clock rate which is double the rate of the first clock, as illustrated by the short vertical lines of clock 230f in FIG. 5f, between times t9 and t11. The samples in unit 436 of FIG. 4 are clocked out at the second clock rate, as illustrated by the short vertical lines of clock 230g of FIG. 5g between time t12 and t13. The samples from unit 434 and 436, respectively, of FIG. 4 are coupled to terminals A and B of a switch 433a, respectively.

FIG. 5j illustrates schematically a signal 233 that is coupled by a wiper k of switch 433a to a terminal E. Wiper k is controlled by timing signal 230l. Wiper k couples the samples of unit 434 at terminal A to terminal E for forming the respective portion of signal 233 between times t9 and t11 as illustrated in FIG. 5j; likewise, wiper k of FIG. 4 couples the samples of unit 436 at terminal B to terminal E between times t12 and t13.

In a like manner, clock 230i of FIG. 5i clocks samples of a chroma line 56 of FIG. 5b between time t10 and time t13 into 1-H delay unit 435 of FIG. 4 at the first clock rate as illustrated by the short vertical lines in FIG. 5i. Simultaneously, clock 230h of FIG. 5h clocks samples of a chroma line 64 of FIG. 5d into 1-H delay unit 437 of FIG. 4 at the same first clock rate. The samples in unit 435 of FIG. 4 are clocked out at the second clock rate which is double the rate of the first clock, as illustrated by the short vertical lines of clock 230i in FIG. 5i between times t14 and t16. The samples in unit 437 of FIG. 4 are clocked out at the second clock rate, as illustrated by the short vertical lines of clock 230h of FIG. 5h, respectively, between time t17 and t18. The samples from unit 435 and 437 of FIG. 4 are coupled to terminals C and D of switch 433a, respectively.

Wiper k couples the samples of unit 435 at terminal C to terminal E between times t14 and t16 of FIG. 5j for generating the respective portion of signal 233; likewise, wiper k of FIG. 4 couples the samples of unit 437 at terminal D to terminal E between times t17 and t18. Signal 233 at terminal E is coupled to a color demodulator 438. Thus, signal 233 of FIG. 5j contains the speeded up I chrominance component of chroma signal $C_a$ of FIG. 5b and chroma signal $C_b$ of FIG. 5d, respectively, in alternate, time-compressed, display video line time slots. For the example of FIG. 5j, each time slot is equal to one-half the 52.6 microseconds active video line time of NTSC signal 130 of FIG. 2.

Color demodulator 438 of FIG. 4 receives a color carrier 230j from timing unit 430 of twice the frequency of the color subcarrier of NTSC signal 130 of FIG. 2. Color demodulator 438 of FIG. 4 combines signal 233 at terminal E with color carrier 230j, for generating a speeded up color signal $I_{2H}$ and a speeded up color signal $Q_{2H}$. Signals $I_{2H}$ and $Q_{2H}$ are coupled to the respective terminals of a conventional I, Q, Y matrix 439. FIG. 5j also may illustrate schematically signals $Q_{2H}$ or $I_{2H}$ of FIG. 4. It should be understood that color demodulation may be accomplished, in a different embodiment of the invention prior to the speedup process.

A speedup unit 433' in FIG. 4, that is illustratively constructed similarly to speedup unit 433 has terminals E', F' and G' that correspond to terminals E, F and G respectively, of speedup unit 433. Unit 433' of FIG. 4 receives clocks 230f-i and signal 230l as does unit 433 and it operates similarly. Luma signal $Y_a$ of block 135 of FIG. 3 is applied to terminal F' of speedup unit 433' of FIG. 4 and luma signal $Y_b$ is applied to terminal G' of speedup unit 433'. A signal $Y_{2H}$ at terminal E' of unit 433' is coupled to matrix 439. Thus, signal $Y_{2H}$ contains the speeded up luminance information of luma signal $Y_a$ of FIG. 5a and of luma signal $Y_b$ of FIG. 5c, respectively, in alternate time slots. FIG. 5k illustrates schematically signal $Y_{2H}$ of FIG. 4, for the first example. Note that the luminance picture information of luma line 52 is speeded up to be contained in signal $Y_{2H}$ between time t14 and time t16. Signal $Y_{2H}$ of FIG. 5k, between times t17a and time t17b, contains the luminance picture information of luma line 52 of FIG. 5a between time t11a and time t12b, because of the effect of motion signal M of FIG. 5l.

I, Q, Y matrix 439, of conventional construction, generates signals R, G and B from signals $I_{2H}$, $Q_{2H}$ and $Y_{2H}$ for driving the respective guns of cathode ray tube 119. FIG. 5j may also illustrate schematically signals R, G and B, respectively.

FIG. 1c illustrates diagrammatically, as an approximation, the respective video lines of NTSC signal 130 of FIG. 2 that supply luminance picture information for display during a vertical scanning interval s in each of scan lines 122–129 of FIG. 1a for an example in which no motion is detected. The picture information is displayed in non-interlaced format during one vertical scanning interval. Note that the same respective video line of NTSC signal 130 of FIG. 2 provides luminance information for display in the same line as in the interlace scanning format of FIG. 1b. For example, between time t14 and time t16 of FIG. 5j, signals R, G and B of FIG. 4 provide the luminance information of video line n+1 for display in line 123.

FIG. 1d illustrates diagrammatically, as an approximation, the respective video lines of NTSC signal 130 of FIG. 2 that supply luminance information for display during the vertical scanning interval s in each of scan lines 122–129 of FIG. 1a, for an example in which motion compensation is performed in scan line 127. In this case, signals R, G and B, between time t17 and time t18 of FIG. 5j, contain together the luminance information of video line n+1 of NTSC signal 130 of FIG. 2 display in scan line 127. Note that in the case where no motion is detected, as illustrated in FIG. 1c, the luminance information of video line n+264 of NTSC signal 130 of FIG. 2 supplies the luminance picture information for display in scan line 127.

When motion is detected between time t11a and time t12a of FIG. 5c, signal $Y_{2H}$ of FIG. 5k between time t17a and t17b contains luminance information of video line n+1 of FIG. 2 that was coupled to terminal 400c of FIG. 4 during the previous field m of NTSC signal 130 of FIG. 2, as illustrated in line 127 of FIG. 1d. Also note that the same luminance information that is contained between time t15a and time t16b of FIG. 5k is also contained between time t17a and time t17b of FIG. 5k. Thus, in each vertical scanning interval, assuming the facts of the hypothetical example, the luminance information for displaying a moving object is derived substantially from the immediately preceding field only. Moreover, the substituted picture information, in the presence of motion, is derived from a signal that contains the picture information that is displayed in an adjacent scan line.

I claim:

1. A television apparatus for generating from an incoming television signal first and second enhanced video signals such that the video lines thereof provide picture information for display in a non-interlaced television display, to form a picture frame, said apparatus comprising:

a first comb filter responsive to said incoming television signal for producing a first luminance signal and a first vertical detail signal, each derived from said incoming television signal;

a delay element for delaying said incoming television signal by substantially one field time thereof;

a second comb filter responsive to said field delayed television signal for producing a field delayed second luminance signal and a field delayed second vertical detail signal, eahc derived from said field delayed television signal;

a source for providing a motion indicating signal;

first combining means coupled to said first comb filter, to said second comb filter and to said source for combining portions of said first and second vertical detail signals and said motion indicating signal with said first luminance signal as a function of said motion indicating signal for generating said first enhanced video signal;

second combining means coupled to said second comb filter for combining said second vertical detail signal with said second luminance signal for generating said second enhanced video signal; and means for displaying said first and second enhanced video signals in a non-interlaced television display.

2. Television apparatus as recited in claim 1 wherein said first combining means has a first operating mode for combining said first vertical detail signal with said first luminance signal and has a second operating mode for combining said second vertical detail signal and said motion indicating signal with said first luminance signal for generating said first enhanced video signal.

3. A television apparatus as recited in claim 1 wherein said source for providing said motion indicating signal includes low pass filter means for limiting the bandwidth of said motion indicating signal to a frequency range below that of a given chrominance signal frequency range.

4. Television apparatus, comprising:

filter means having an input for receiving a composite video input signal and having five outputs for providing, respectively, a first line-comb filtered luminance signal, a first line-comb filtered vertical detail signal, a second line-comb filtered and field-delayed luminance signal, a second line-comb filtered and field-delayed vertical detail signal and a motion indicating signal;

first output signal forming means coupled to said filter means for selectively combining said first and second vertical detail signals and said motion signal with said luminance signal as a function of said motion signal to form a first processed luminance output signal;

second output signal forming means coupled to said filter means for combining said second luminance signal with said second vertical detail signal to form a second processed luminance ouput signal; and display means coupled to said output means for displaying said processed output signals in progressive scan fashion.

5. Television apparatus as recited in claim 4 wherein said firs output signal forming means includes motion detector means responsive to said motion indicating signal for controlling the relative proportions of said first and second vertical detail signals and said motion indicating signal that are combined with said first luminance signal such that under relatively low motion conditions said first output signal mainly comprises said first luminance signal and said first vertical detail signal and under relatively high motion conditions said first output signal mainly comprises said first luminance signal, said second vertical detail signal and said motion signal.

6. Television apparatus as recited in claim 4 wherein said filter means includes low pass filter means for limiting the bandwidth of said motion indicating signal to a frequency range below that of a given chrominance signal frequency range.

7. Television apparatus, comprising:

filter means having an input for receiving a composite video input signal and having five outputs for providing, respectively, a first line-comb filtered luminance signal, a first line-comb filtered vertical detail signal, a second line-comb filtered and field-delayed luminance signal, a second line-comb filtered and field-delayed vertical detail signal and a motion indicating signal;

first output signal forming means coupled to said filter means for selectively combining said first and second vertical detail signals with said first luminance signal as a function of said motion signal to form a first processed luminance output signal;

second output signal forming means coupled to said filter means for combining said second luminance signal with said second vertical detail signal to form a second processes luminance output signal; and display means coupled to said output means for displaying said processed output signals in progressive scan fashion.

8. Television apparatus as recited in claim 7 wherein said first output signal forming means includes motion detector means responsive to said motion indicating signal for controlling the relative proportions of said first and second vertical detail signals that are combined with said first luminance signal such that under relatively low motion conditions said first output signal comprises said first luminance signal and said first vertical detail signal and under relatively high motion conditions said first output signal comprises said first luminance signal and said second vertical detail signal.

9. Television apparatus as recited in claim 7 wherein said filter means includes low pass filter means for limiting the bandwidth of said motion indicating signal to a frequency range below that of a given chrominance signal frequency range.

10. Television apparatus, comprising:

filter means having an input for receiving a composite video input signal and having three outputs for providing, respectively, a first line-comb filtered luminance signal, a second line-comb filtered and field-delayed luminance signal, and a motion indicating signal;

first output signal forming means coupled to said filter means for selectively combining said motion signal with said first luminance signal as a function of said motion signal to form a first processed luminance output signal;

second output signal forming means coupled to said filter means for processing said second luminance signal to form a second processed luminance output signal; and display means coupled to said output means for displaying said processed output signal in progressive scan fashion; and wherein said first output signal forming means includes motion detector means responsive to said motion indicating signal for controlling the relative proportions of said motion indicating signal that are combined with said first luminance signal such that the proportion of said motion indicating signal increases for increases in magnitude of said motion indicating signal.

11. Television apparatus as recited in claim 10 wherein said filter means includes low pass filter means for limiting the bandwidth of said motion indicating signal to a frequency range below that of a given chrominance signal frequency range.

* * * * *